United States Patent [19]

Bernhardt

[11] Patent Number: 5,724,135
[45] Date of Patent: Mar. 3, 1998

[54] HYPER-SPECTRAL IMAGING USING ROTATIONAL SPECTRO-TOMOGRAPHY

[75] Inventor: Paul A. Bernhardt, Alexandria, Va.

[73] Assignee: The United States of America as represented by the Secretary of the Navy, Washington, D.C.

[21] Appl. No.: 622,231

[22] Filed: Mar. 27, 1996

[51] Int. Cl.$^6$ ................................................ G01J 3/28
[52] U.S. Cl. ........................................................ 356/328
[58] Field of Search ........................... 356/402–411, 326, 356/328, 330–334; 250/226, 339.08, 339.11, 339.14, 339.07

[56] References Cited

U.S. PATENT DOCUMENTS

| | | |
|---|---|---|
| 2,856,531 | 10/1958 | Brouwer . |
| 3,389,256 | 6/1968 | Astheimer . |
| 3,922,089 | 11/1975 | Danielsson et al. . |
| 4,497,540 | 2/1985 | Breckinridge et al. ............. 356/331 X |
| 4,678,332 | 7/1987 | Rock et al. . |
| 4,746,798 | 5/1988 | Amon et al. . |
| 4,921,350 | 5/1990 | Giebeler . |
| 5,329,353 | 7/1994 | Ichimura et al. . |
| 5,354,980 | 10/1994 | Rappoport et al. ..................... 250/226 |
| 5,369,276 | 11/1994 | Antesberger . |
| 5,379,065 | 1/1995 | Cutts . |

OTHER PUBLICATIONS

Letter dated Dec. 23, 1996, from Alexander Scheeline to Paul Bernhardt, re publication of abstracts from the SPIE Progress in Biomedical Optics symposium of Feb. 1995 in San Jose, California.

P.A. Bernhardt, Increased Photon Counting Efficiency for Multi–Spectral Imaging Using Rotational Spectro–Tomography, Ultrasensitive Instruments For DNA Sequencing, SPIE vol. 2386, p. 288 Mar. 27, 1995.

Letter dated Jan. 30, 1996, from Helen LaMar of SPIE to Code 3008.2, Naval Research Laboratory, covering an abstract of document AA, and discussing the abstract's dissemination per the "Bios section of the Photonics West Symposium," with attached abstract.

Cover sheet of the proceedings of the Biomedical Optics Society (Bios section) of the Photonics West Symposium (with a FAX sticker date of Feb. 6, 1996 from "Helen" of SPIE.

FAX dated Mar. 13, 1996 from Helen Lamar of SPIE to Naval Research Laboratory, Code 3008.2, re the publication date of AA, above.

P.A. Bernhardt, Direct Reconstruction Methods for Hyperspectral Imaging with Rotational Spectrotmography, J. Opt. Soc. Am. A, vol. 12, No. 9 (Sep., 1995).

P.A. Bernhardt et al, Hyper–Spectral Imaging Using Rotational Spectro–Tomography, SPIE, vol. 2480, p. 78 (proceedings of the conference Apr. 17–18, 1995).

*Primary Examiner*—K. Hantis
*Attorney, Agent, or Firm*—Thomas E. McDonnell; Edward F. Miles

[57] ABSTRACT

A rotational hyper-spectral imager is disclosed. The rotational hyper-spectral imager collects substantially all available photon flux emitted by an object being detected and analyzed and allows the rotational hyper-spectral imager to determine the composition of the objects. The rotational hyper-spectral imager is particularly suited to detect and analyze objects having weak illumination.

2 Claims, 4 Drawing Sheets

HYPER-SPECTRAL IMAGING USING ROTATIONAL SPECTRO-TOMOGRAPHY

BACKGROUND OF THE INVENTION

This invention relates to image processing and, more particularly, to hyper-spectral imaging processing using rotational spectro-tomography that determines the physical structure of an object and its composition by measuring the photon flux emitted from the object being detected.

In imaging processing, the image of a physical object can be resolved into spatial (x,y) and optical wavelength ($\lambda$) coordinates. In spectral imaging, all of the coordinates are determined by detecting and analyzing the photon flux emitted by the physical object. The spatial information provides the location and physical structure of the object. The wavelength information can be analyzed to yield composition and emission characteristics of the object. The term "multi-spectral" refers to imaging at several wavelengths. When obtaining images of an object at many more than ten wavelengths, the term "hyper-spectral" is used. As known in the art, hyper-spectral imaging systems separate the optical data into the three-dimensional (3-D) space of the "data cube."

Multi-spectral and hyper-spectral imaging systems have wide ranging applications for medicine, environmental monitoring, and rocket plume signatures. These applications are more fully described in the following five (5) technical articles/technical manuals all of which are herein incorporated by reference:

(1) "Multispectral System for Medical Fluorescence Imaging" of P. S. Andersson, S. Montan, and S. Svanberg, published in *IEEE J. Quant. Elect.*, Vol. QE-23, pp. 1798–1805 (1987).

(2) "Introduction to the Physics and Techniques of Remote Sensing" of C. Elachi, published in Wiley-Interscience, New York (1987).

(3) "Influence of Particulates in Infrared Emissions from Tactical Rocket Exhausts" of H. F. Nelson, published in *Spacecraft and Rockets*, 21(5), 425–432, 1984.

(4) "Calculation of Visible Radiations from Missile Plumes" of R. B. Lyons, J. Wormhoudt, and C. E. Kolb, published in *Spacecraft Radiative Heat Transfer and Temperature Control (Progress in Astronautics and Aeronautics*, 83), AIAA, Washington, D.C., 128–148, June 1981.

(5) "Scattered Visible and Ultraviolet Solar Radiation from Condensed Attitude Control Jet Plumes" of C. E. Kolb, R. B. Lyons, H. B. Huffman, et al, published in *J. Spacecraft and Rockets*, 20, 383–389, 1983.

A multi-spectral scanner has been used on Landsat project to provide soil type discrimination, water body delineation, differentiation between snow and clouds, and surface temperature measurements. This Landsat application is more fully described in the following technical article, which is herein incorporated by reference: "Design Challenges of the Thematic Mapper" of L. E. Blanchard, and O. Weinstein, published in IEEE Trans. on Geoscience and Remote Sens., 146–160 (1980).

Spectroscopic measurements of aurora and airglow emissions yield the composition of the upper atmosphere, the motion of charged particles, and the energy distribution of the accelerated electrons. These spectroscopic measurements are more fully described in the following textbook, which is herein incorporated by reference: Physics and Chemistry of the Upper Atmosphere of M. H. Rees, published in *Cambridge University Press*, Cambridge (1989).

The release of fluorescent chemicals such as barium, lithium, strontium, calcium and europium from rockets or satellites have been used to trace or stimulate a number of processes in space, and is more fully described in the following technical article which is herein incorporated by reference: "Probing the Magnetosphere Using Chemical Releases from the Combined Release and Radiation Effects Satellite" of P. A Bernhardt, published in *Phys. Fluids B*, 4(7), 2249–2256 (1992). The higher spectral resolution of a hyper-spectral system can provide better localization of a target spectral features than currently provided by multi-spectral systems and, accordingly, further advances in hyper-spectral systems are being pursued.

One objective of imaging spectroscopy, involved in hyper-spectral systems, is to localize a target feature that identifies a specific condition or species being detected. Images of these spectral features may be difficult to obtain due to the spectral overlap of different components of the object being detected. To help overcome this difficulty, a hyper-spectral imaging system is used to suppress the spectral emissions from background structures related to the object being detected and also to enhance the spectral components of the target features of the detected object in the image. For example, consider a hyper (multiple wavelengths)-component object defined by the below expression:

$$B(x_1,y_1,z_1) = \sum_n A_n(x_1,y_1)D_n(z_1) \qquad (1)$$

where $x_1$ and $y_1$ are spatial coordinates of an image plane perpendicular to the optical line of sight towards the target and in which the target lies, $z_1$ is the spectral coordinate proportional to wavelength ($\lambda$), $A_n$ is the concentration of the $n^{th}$ component, and $D_n$ is the spectral signature or identification of that component. A filter function $\hat{D}_n$ can be found to yield optimum estimation of the $n^{th}$ component as more fully disclosed in the technical article "A Fast Algorithm for Real Time Demixing of Hyperspectral Data," of P. Palmadesso, published in Naval Research Laboratory (NRL) Memo. Rept., June 1994. A filtered image $\hat{A}_m$ may be obtained using the below expression:

$$\hat{A}_n(x_1,y_1) = \int B_1(x_1,y_1,z_1)\hat{D}_n(z_1)dz_1$$

where $\hat{A}_m$ is the best estimate of the $m^{th}$ component of the hyper-component object of expression (1). In atmospheric remote sensing or plume imaging, the function $D_n$ represents the spectral signature or identification of one gaseous constituent that may contribute to the overall emission spectrum.

In hyper-spectral systems, the photon capture efficiency, G, is defined at the ratio of detected photons to available photons. For many applications, such as the detection of natural and/or artificial emissions having weak illumination of the object being detected, it is necessary to use a detection system with value of G near unity. The temporal resolution of hyper-spectral imaging systems is limited by the total number of photons entering the instrument. Detection sensitivity of such hyper-spectral imaging systems is limited by noise from background radiation and detector dark current. Low-light-level sources, serving as the object being detected, commonly require long integration times by the hyper-spectral imaging system for adequate photon counts to yield low noise images. The measurement of the component concentrations for a spectral object is limited by the photon flux commonly occurring during relatively short observation periods by the hyper-spectral imaging system.

As is known in the art, hyper-spectral imaging systems commonly separate the optical data representative of the object being detected into the three-dimensional (3-D) space of the "data cube," i.e. represent the data as a function of $x_1$, $y_1$, and $z_1$. Hyper-spectral imagers typically slice or divide the data cube along either (1) constant wavelength planes or (2) planes perpendicular to the axis of one spatial coordinate of the data cube. To provide constant wavelength slices, a number of narrowband filters at the input stage of the hyper-spectral imaging systems can be rotated in front of additional components of the imaging system to yield a sequence of two-dimensional (2-D) images at selected wavelengths. Slices along a fixed spatial coordinate of the data cubes are obtained with an imaging spectrometer so as to give a sequence of distance versus wavelength images as the position of the slit of an optical stop member sometimes referred to as a field lens is stepped across the object. In imaging spectrometer, the field of view is restricted by a slit of size $\gamma s$ and the light is dispersed by a grating to produce a first order image at the off-axis of a detector array typically comprised of pixels. Both of the techniques of slicing of the data cube are inefficient because most of the available photons from the photon flux emitted from the object being detected and arriving at the hyper-spectral system are lost during the imaging process, either by spectral filtering, or by spatial filtering (e.g. by use of a diffraction slit). It is desired that more efficient hyper-spectral imaging systems, and methods of operation thereof, be provided so that essentially all of the photons emitted by the object being detected are used in the imaging process.

OBJECTS OF THE INVENTION

Accordingly, it is a primary object of the present invention to provide a hyper-spectral imaging system having means to substantially capture and utilize all of the photon flux entering the system that is emitted by the object being detected.

Another object of the present invention is to provide a hyper-spectral imaging system employing a known imaging technique termed "spectro-tomography", that collects all available photon flux and relies on computer tomography to construct a three-dimensional data cube of the image being detected.

Further, it is an object of the present invention to provide a spectro-tomographic imager having rotational capabilities that utilizes all available photon flux emitted by an object being detected and presents such flux to a detector array of the rotational spectro-tomographic (RST) imager.

Further still, it is an object of the present invention to provide a rotational spectro-tomographic (RST) imager that has zoom capabilities which enhance the detection of the wavelength characteristic of the object being detected.

SUMMARY OF THE INVENTION

The present invention is directed to a rotational spectro-tomographical (RST) imager having a wide field of view primarily provided by a circular aperture, in lieu of a narrow slit, in its optical stop member sometimes referred to as a field lens so that substantially all of the photon flux emitted by an object being detected and entering the RST imager is utilized and analyzed in the determination of the characteristic of the detected object.

The rotational hyper-spectro-tomographic imager has an optical axis and resolves the image of an object into spatial (x,y) coordinates and a spectra coordinate that includes the optical wavelength ($\lambda$) from the detection of the photon flux emitted from the object, wherein the spatial and spectral coordinates determine the characteristics of the object. The rotational hyper-spectro-tomographical imager comprises a filter, first, zoom and second lenses, a field lens, a diffraction grating, and a detector.

The filter is located at the input stage of the RST imager and has first and second faces and passes a predetermined range of wavelengths. The first face of the filter is positioned to receive the photon flux of the object. The first lens has first and second faces with the first face positioned to look toward the second face of the filter. The field lens is mounted for rotation and has a circular aperture and is positioned from the first lens by a first predetermined focal length $f_1$. The zoom lens has first and second faces and is mounted for movement relative to the field lens so as to establish a second focal length $f_2$. The first face of the zoom lens is positioned to look toward the second face of the first lens. The diffracting grating has first and second faces and is mounted for rotation. The first face of the diffracting grating is positioned to look toward the second face of the zoom lens. The second lens has first and second faces and is mounted for movement. The first face of the second lens is positioned to look toward the second face of the diffracting grating. The detector detects the photon flux of the object and has a receiving surface positioned to look toward the second face of the second lens and is located relative to the second lens to establish a third focal length $f_3$. The circular aperture of the field lens has a central portion in coincidence with the optical axis and, similarly, the filter, the first, zoom and second lenses, the diffracting grating, and the detector each have a central portion that is also in coincidence with the optical axis. The imager is rotated in fixed angular steps around the optical axis, and the focal length of the zoom lens is adjusted, typically in discrete steps.

BRIEF DESCRIPTION OF THE DRAWINGS

These and other objects, features and advantages of the present invention, as well as the invention itself, will become better understood by reference to the following detailed description when considered in conjunction with the accompanying drawings, wherein like reference numbers designate identical or corresponding elements throughout the several views and, wherein.

DETAILED DESCRIPTION OF THE PREFERRED EMBODIMENTS

Figure 1:
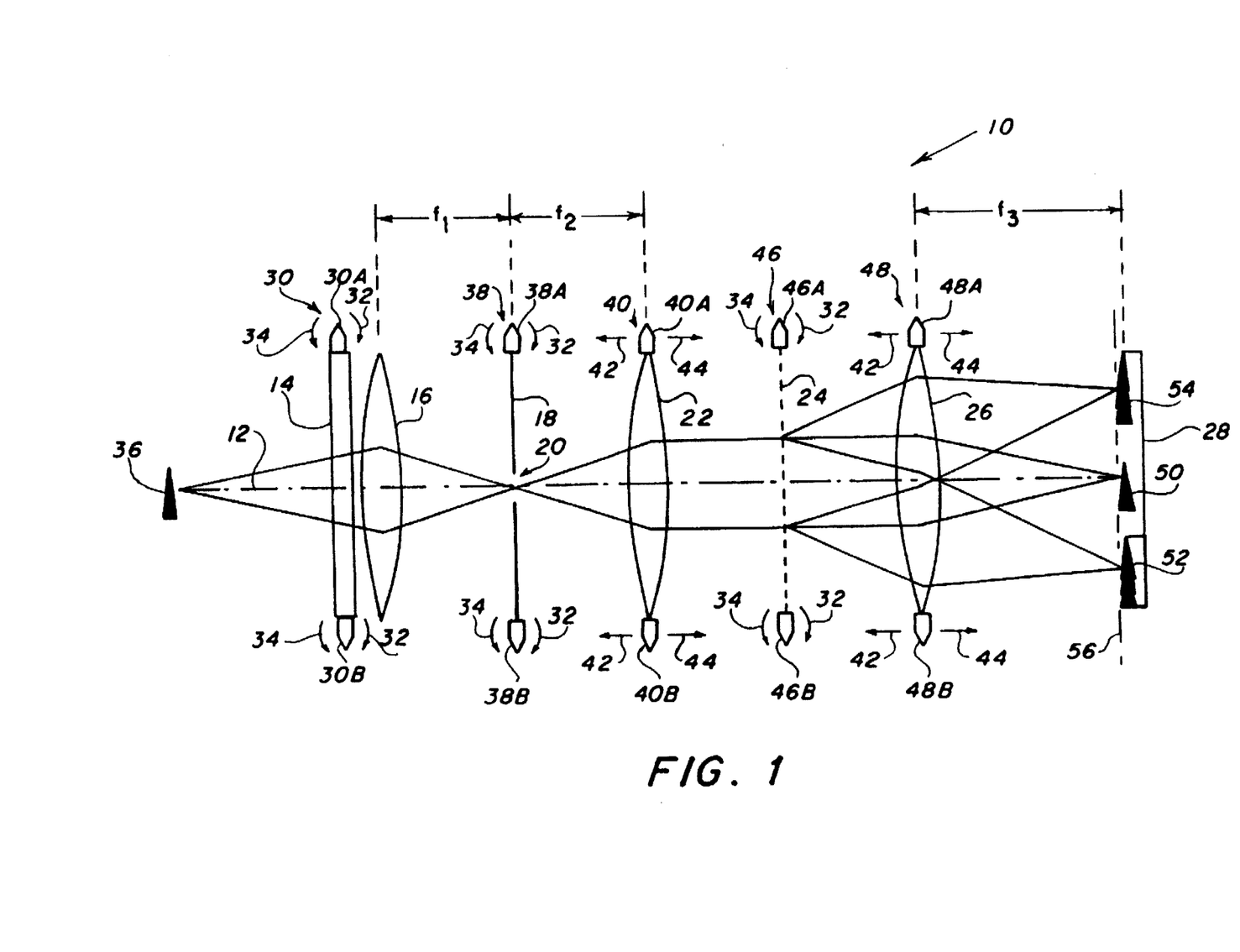
FIG. 1 is a schematic of the arrangements of the primary elements of the rotational hyper-spectro-tomographic (RST) imager of the present invention.

With reference to the drawing, FIG. 1 illustrates a rotational hyper-spectro-tomographic imager 10 having an optical axis 12. The hyper-spectro-tomographic imager 10 resolves the image of an object being detected into spatial (x,y) coordinates and into a spectral coordinate that includes the optical wavelength ($\lambda$) associated with the detection of the photon flux emitted by the object. The spatial and spectral coordinates determine the characteristic of the object. The rotational hyper-spectro-tomographic imager 10, hereinafter referred to as the RST imager 10, comprises a bandpass optical-wavelength filter 14, and objective first lens 16, a field lens 18 (sometimes referred to as an optical stop) having an aperture 20 of a predetermined radius $r_a$, a zoom lens 22, a diffraction grating 24, a second or imaging lens 26, and a detector 28.

The bandpass optical-wavelength filter 14 is located at the input stage of the RST imager 10 and has first and second faces. The filter 14 has means 30 comprised of upper and lower portions 30a and 30b and attached to filter 14 so as to rotate the filter in a clockwise direction 32 or in a counterclockwise direction 34. The rotational means 30 for filter 14, as well as the rotational and/or movement means for field lens 18, zoom lens 22, diffraction grating 24 and second lens 26, may be any suitable type known in the art. The filter 14 restricts the light entering the input stage of the RST imager 10 and impinging the first lens 16 to a predetermined range defined by wavelengths between $\lambda_a$ and $\lambda_b$, wherein $\lambda$ is to be further described hereinafter. The filter 14 has its first face positioned to receive the photon flux, in the form of light, of an object 36 being detected by the RST imager 10. The object 36 may be any of the various objects described in the "Background" section and detected and analyzed by the RST imager 10.

The lens 16 has first and second faces with the first face positioned to look toward the second face of the filter 14. The first lens 16 focuses the image related to the object 36, being detected by the RST imager 10, onto the field lens 18 having an aperture 20. More particularly, the first lens 16 and the field lens 18 are positioned relative to one another to establish a first focal length $f_1$ so that the lens 16 focuses the image of the object 36 onto or into the aperture 20.

The field lens 18 has means 38 with upper and lower portions 38a and 38b attached to opposite ends of the field lens 18 and is used to rotate field lens 18 in a clockwise direction 32 or in a counterclockwise direction 34. The aperture 20 having a radius $r_a$ restricts the spatial viewing angle of the RST imager 10 in a manner as to be described hereinafter. The field lens 18 is adjustably positioned relative to the first lens to establish the first predetermined focal length $f_1$.

The zoom lens 22 has first and second faces and has means 40 with upper and lower portions 40a and 40b attached to opposite ends of the zoom lens 22 allowing lens 22 to be moved a forward direction 42 or reverse direction 44 both directions as being viewed in FIG. 1. The means 40 is operatively connected to the zoom lens 22 so that the position of the zoom lens 22 may be moved relative to the field lens 18 so as to establish an adjustable second focal length $f_2$. The first face of the zoom lens 22 is positioned toward the second face of the first lens 16.

The diffraction grating 24 has means 46 having upper and lower portions 46a and 46b mounted to opposite ends of the diffraction grating 24 and allowing the diffraction grating 24 to be rotated in a clockwise direction 32 or in a counterclockwise direction 34. The diffraction grating 24 operates in a manner known in the art and has first and second faces, with the first face thereof positioned to look toward the second face of the zoom lens 22. The diffraction grating 24 may also comprise prisms having multiple or variable dispersion patterns, or by any other optical dispersion media which is image maintaining. The light emitted from lens 22 passes through the slits or is reflected by the prisms of the diffraction grating 24 to produce a spectrum (similar to that set-up by a prism) as a result of interference patterns. The spectrum produced by the diffraction grating 24 is transferred or focused onto the second or imaging lens 26.

The imaging lens 26 has first and second faces and has means 48 having upper and lower portions 48a and 48b mounted to opposite ends of imaging lens 26 to allow lens 26 to be moved in either direction 42 or 44 as viewed in FIG. 1. The imaging lens 26 has its first face positioned to look toward the second face of the diffracting grating 24. The imaging lens 26 collects and focuses the light rays making up the spectrum produced by the diffraction grating 24 and then produces and focuses an image of the $m^{th}$ order diffracted light onto the detector 28, where m=0, ±1, ±2, ...

The detector 28 may be a video display screen or any other light collective and sensitive device preferably comprised of pixels. The detector 28 has an image plane 56 and is shown as collecting diffracted images 50, 52 and 54 respectively representative of the zero (0) order, first (+) order and first (−) order, all containing both spatial and wavelength information of the object 36 being detected. The detector 28 may have a central portion corresponding to the location of the zero (0) order image 50 that is in coincidence with the optical axis 12. In the preferred embodiment, the detector is centered at the location of the first order image 52. Similarly, the circular aperture 20 of the field lens 18 has its central portion in coincidence with the optical axis 12. Furthermore, the filter 14, the first, zoom and second lenses 16, 22 and 26, and the diffraction grating 24 have central portions in coincidence with the optical axis 12. The images displayed on the image plane 56 of detector 28 are spectral/spatial projections of the object data view along the integrated line 58 that makes an angle Θ with a spatial coordinate frame 60 that may be further described with reference to FIG. 2.

Figure 2:
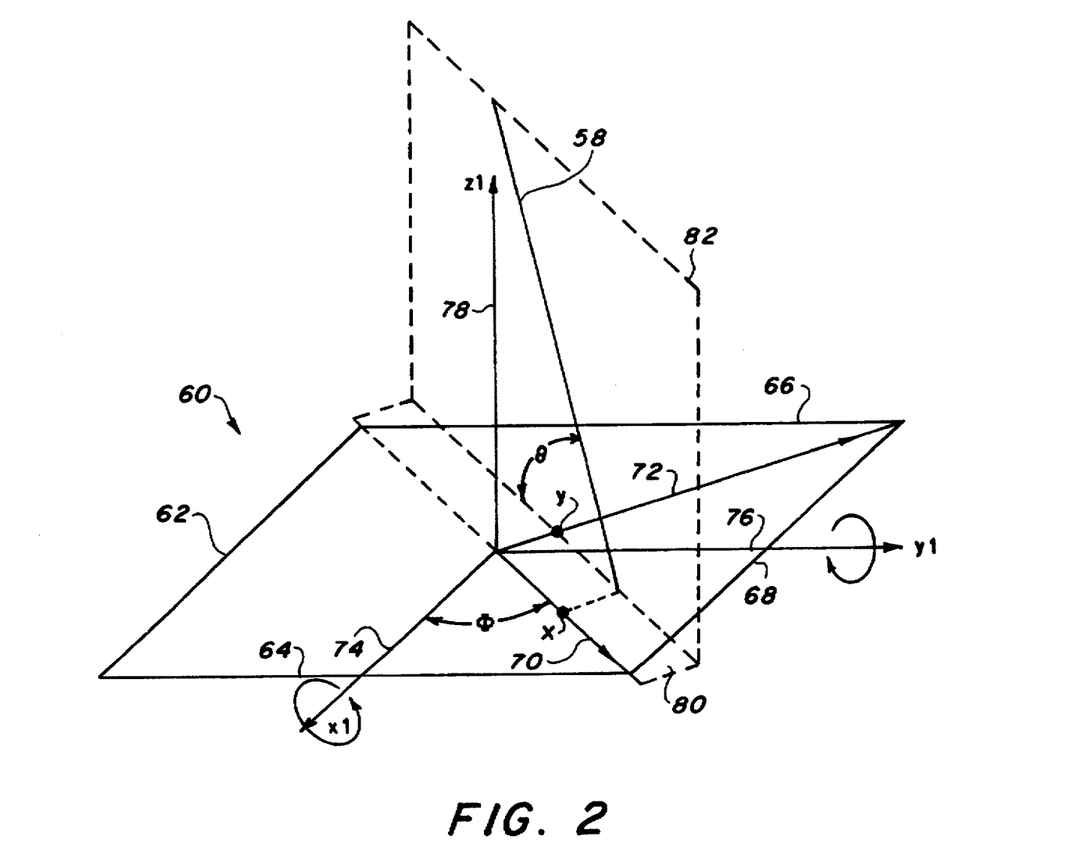
FIG. 2 illustrates the geometry associated with the present invention for the spectro-tomographic transformed in three-dimensions.

FIG. 2 illustrates the geometry of the present invention for the spectro-tomographically transform in three-dimensions and shows the spatial coordinate plane 60 as having four sides 62, 64, 66 and 68, with sides 62 and 68 and 64 and 66 being respectively parallel to each other. FIG. 2 represents the x coordinate by directional line 70 and the y coordinate by directional line 72. FIG. 2 also represents spatial-spectral coordinates $x_1$, $y_1$ and $z_1$ respectively by directional lines 74, 76 and 78, wherein the $z_1$ axis represents the spectral axis and the axes $x_1$ and $y_1$ represent the spatial coordinates both for a projection of the object data cube previously discussed in the "Background" section.

FIG. 2 further illustrates, in phantom, that the spatial coordinate plane 60 as having a horizontal extension 80 and a vertical extension 82, and wherein the integration line 58 is displaced from the extension 80 by the angle Θ previously discussed. Still further, FIG. 2 illustrates the axis x, (represented by directional line 74) as being displaced from the extension 80 by an angle Φ.

In practice, grating 24 receives a spatially diffracted image of object 36, and spectrally diffracts it onto lens 26, and ultimately onto optical detector array 28. Members 24, 26, 28 are then rotated together about optical axis 12 to collect the maximum amount of spectrally diffracted light on detector 28. The light detected will, of course, be limited by the optical transfer function of the system, which will generally be in the form shown in FIGS. 5(a) through 5(f). As one can see from these figures, these transfer functions have gaps of angular width Θ on either side of the line at a spatial frequency of zero ($f_z=0$). Because Θ=Arctan($f_3/f_2$), one can open or close these gaps by appropriately varying $f_3$ and $f_2$, i.e. zooming lenses 22 and 26 with respect to one another. By doing this, and repeating the taking of data for plural zoom positions, one can accumulate more data than would be available with only one zoom position, and hence have a more complete description of object 36 in Fourier space. In a preferred embodiment the RST imager 10 can have all elements rotatable about the optical axis. It is essential for best operation that elements 24, 25, 56 are locked together and rotatable together. The images of object 36 displayed on the image plane 56 of the detector 28 may be further described with reference to FIGS. 3 and 4.

Figure 3:
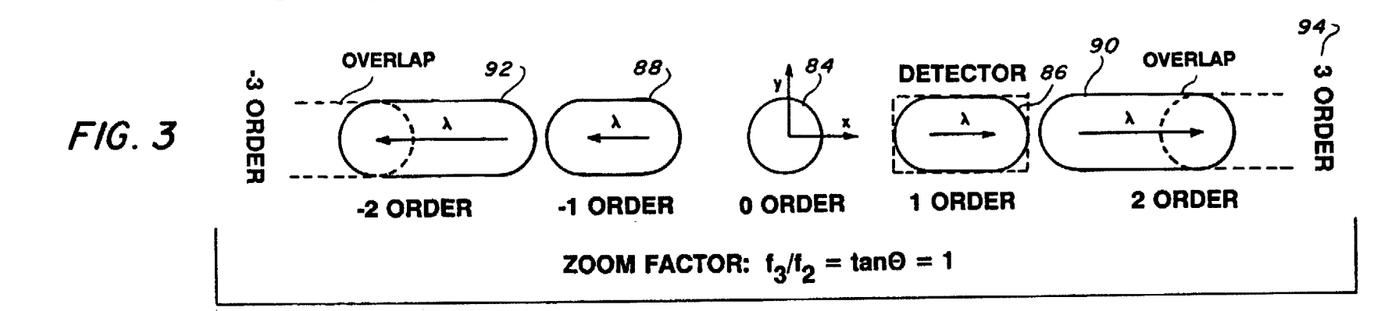
FIGS. 3 and 4 illustrate various spatial and spectral dispersions achieved by the zooming capability of the (RST) imager of FIG. 1.
Figure 4:
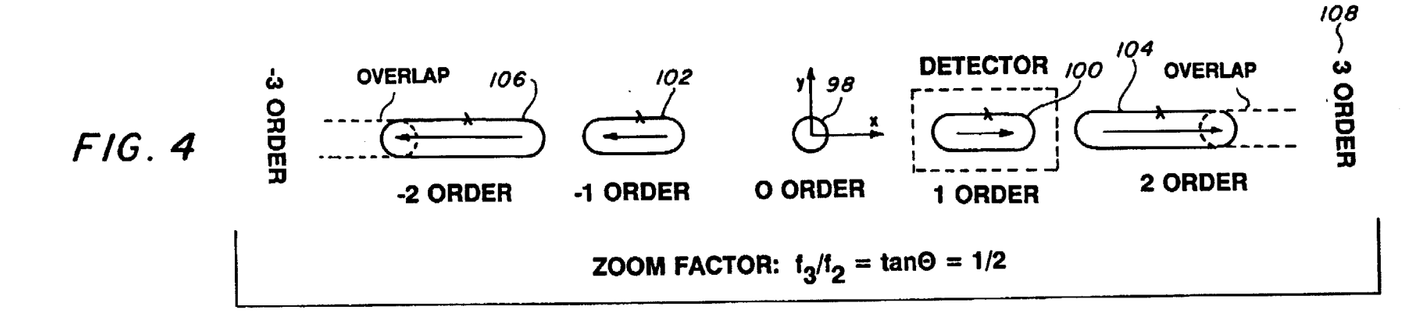

FIGS. 3 and 4 illustrates various light distributions in the image plane 56 on the detector 28. FIG. 3 comprises FIGS. 3(a)-3(g) and, similarly, FIG. 4 comprises FIGS. 4(a)-4(g). Each of the FIGS. 3(a)-4(g) illustrates a distribution related to a $m^{th}$ order of diffracted images indicated (except FIGS. 3(A) and 4(A) by wavelength $\lambda$ in the image plane 56 and such distributions are tabulated in Table 1. Placing the detector area around the first order diffracted images 96 and 100 eliminates optical interference from the 0th, ±2nd, and ±3rd order light.

TABLE 1

| FIG. | DISTRIBUTION | $m^{TH}$ ORDER OF DIFFRACTED LIGHT |
|---|---|---|
| 3(a) | 84 | 0 |
| 3(b) | 86 | 1 |
| 3(c) | 88 | -1 |
| 3(d) | 90 | 2 |
| 3(e) | 92 | -2 |
| 3(f) | 94 | 3 |
| 3(g) | 96 | -3 |
| 4(a) | 98 | 0 |
| 4(b) | 100 | 1 |
| 4(c) | 102 | -1 |
| 4(d) | 104 | 2 |
| 4(e) | 106 | -2 |
| 4(f) | 108 | 3 |
| 4(g) | 110 | -3 |

The diffracted images illustrated in FIGS. 3 and 4 are adjustable by a zoom factor represented by focal length f1/focal length $f_2$ which, in turn, is represented by the quantity tan $\Theta$. FIG. 3 illustrates the light distributions yielded when the zoom factor $f_3/f_2$=tan $\Theta$=1, whereas the light distributions of FIG. 4 are yielded by a zoom factor $f_3/f_2$=tan $\Theta$=½.

In general, the present invention uses a technique commonly referred to as spectro-tomography, the implementations of which are based on imaging systems, such as the RST imager 10 of FIG. 1, that uses either (1) one-dimensional image diffraction with gratings or prisms having multiple or variable dispersions, or (2) rotation of optical elements, such as field lens 18, in particular the aperture 20 of FIG. 1. It is preferred that the grating is selected so that most of the light is dispersed to the first order region of the detector indicated by reference number 52 of FIG. 1.

The image plane 56 of the detector 28 contains both spectral and spatial information about the object being detected by the RST imager 10 of FIG. 1. FIGS. 3 and 4 show the dispersion distributions of the circular aperture 20 in cooperation with several grating orders of the diffraction grating 24. The arrangement of FIG. 1 is adjusted so that the light appearing at the image plane 56 from the first and second orders thereof, caused by the dispersion produced by diffraction grating 24, do not overlap. The detector area, in particular, the image plane 56 is selected to preferably cover the +1 order image (see FIGS. 3(b) and 3(c) and FIGS. 4(b) and 4(c)), where the x-direction is influenced by both horizontal ($x_1$) and by wavelength ($\lambda$ or $z_1$) variations in the object 36 being detected. Changing the RST imager's 10 focal length ratio $f_3/f_2$=tan $\Theta$ affects the relative spatial and spectral contributions to the image as illustrated in FIGS. 3 and 4.

In the practice of this invention, tomographic procedures are used to separate the spectral and spatial contributions to the images being analyzed by the RST imager 10. Variable dispersion techniques are used to determine these contributions and use measurements over a range of $\Theta$ (see FIG. 2) to reconstruct the object data cube and such techniques are more fully disclosed in the following two technical articles, both of which are herein incorporated by reference: "Spectrotomography—A New Method of Obtaining Spectrograms of Two-dimensional Objects" of F. V. Bulygin, and G. N. Vishnyakov, published in SPIE Vol. 1843 Analytical Methods for Optical Tomography, 315–322, 1991, and "Spectral Imaging via Computed Tomography" of J. T. Mooney, published in Proceedings of the IRIS Specialty Group on Passive Sensors, 1994.

Rotation of a dispersion element, that is, for example, the diffraction grating 24 of FIG. 1 is also used in the tomographic procedures. Dispersed images for reconstructions may be obtained by (1) rotating an optical element, such as the filter 14 or the dispersion element 24, in either direction 32 or 34, around the optical axis 12 in fixed steps, in a manner as described in the previously mentioned technical articles of Bulygin et al or Mooney or (2) by simultaneously capturing all of the zero and first order images in a crossed grating system as more fully described in the following two technical articles, both of which are herein incorporated by reference: "Simultaneous Acquisition of Spectral Image Information" of T. Okamoto, and I. Yamaguchi, published in Optics Letters, 16(16), 1277–1279, 1991, and "Simultaneous Acquisition of Spectral and Spatial Intensity Distribution" of T. Okamoto, A. Takahishi, and I. Yamaguchi, published in Applied Spectroscopy, 47(8), 1198–1201, 1993.

With references to FIGS. 1 and 2, but most particularly FIG. 2, if the object 36 being detected and analyzed by the RST imager 10 is assumed to be at infinite distance from the RST imager 10, the angular coordinates ($\alpha_x, \alpha_y$) relative to the optical axis 12 of the RST imager 10 are related to the field lens' aperture 20 coordinates ($x_1, y_1$) of FIG. 2 by the relations given by the below expression:

$$x_1 = -f_1\alpha_x \text{ and } y_1 = -f_1\alpha_y \qquad (3)$$

where $f_1$ is the focal length of the first lens 16 which produces an image at the field lens' aperture 20. Similarly, the angular coordinates ($\beta_x, \beta_y$) of the light impinging on the diffraction grating 24 are given by the below expression:

$$\beta_x = -x_1/f_2 \text{ and } \beta_y = -y_1/f_2 \qquad (4)$$

where $f_2$ is the focal length of the second lens 22.

The last set of coordinates (x,y) of FIG. 2 associated with object 36 being analyzed by the RST imager 10 are at the detector plane 56 of the detector 28. The rulings selected for the diffraction grating 24 are oriented so that the light is dispersed in the x-direction. The angular deflection ($\Psi_\lambda$) introduced by the transmission created by the diffraction grating 24 is given by the below expression:

$$\sin\Psi_\lambda = \lambda m v \qquad (5)$$

where $\lambda$ is wavelength (previously discussed with reference to FIGS. 1, 2, 3 and 4), m is order (such as those shown in FIGS. 3 and 4), and v is the spatial frequency of the diffraction grating lines of grating 24. At a central wavelength $\lambda_0$ of the object 36, the angular displacement is taken relative to a central angle $\Psi_{10}=\sin^{-1}(\lambda_0 mv)$ is the angular displacement to the center of the detector 28 at image location 52. In the preferred embodiment, the detector is located at image 52. The linearized angular displacement for an incremental change in wavelength is given by the below expression:

$$d\Psi/d\lambda = mv/\cos\Psi_{\lambda_0}. \qquad (6)$$

If the angular coordinates $(\gamma_x,\gamma_y)$ are centered on the angles $(\Psi_{\lambda_0},0)$, then the light contained in the spectrum being emitted from the diffraction grating 24 enters the second lens 26 at $\gamma_x$ given by the below expression:

$$\gamma_x=\beta_x+(\lambda-\lambda_0)d\Psi/d\lambda \text{ and } \gamma_y=\beta_y. \qquad (7)$$

These angles of expression (7) are translated into the detector 24 coordinates of FIG. 2 by the expression given below:

$$x=\gamma_x f_3 \text{ and } y=\gamma_y f_3 \qquad (8)$$

where $f_3$ is the focal length of the second lens 26.

Combining expressions (4) through (8), yields the optical system coordinate transformation shown in FIG. 2 and represented by the below relationships:

$$x=x_1 f_3/f_2+z_1(\lambda) \text{ and } y=y_1 f_3/f_2 \qquad (9)$$

where $$z_1=mv(\lambda-\lambda_0)f_3/\cos\Psi_{10}. \qquad (10)$$

In the preferred embodiment, the image of object 36 at the detector plane 56 in normalized coordinates at location 52 contains both spatial $(x_1,y_1)$ and spectral/wavelength $(z_1)$ information.

The objective of the analysis performed by tomographic procedures of the present invention is to reconstruct a spatial-spectral object $B(x_1,y_1,z_1)$ from measurements at the detector plane 56 of the detector 28. Following the convention of Bulygin and Vishnyakov of the hereinbefore given technical articles, $\Theta$ is the $(x_1,z_1)$-space projection angle, where $\tan\Theta=f_3/f_2$ for the RST imager 10 of FIG. 1. Variations in e are obtained by changing (or "zooming") the focal length $f_2$ by way of means 40 of FIG. 1. For $\Theta\to\pi/2$, the dispersion by the diffraction grating 24 becomes negligible. As $\Theta\to 0$, the spatial information is lost in the x-direction and chromatic dispersion dominates the detector image displayed on detector 28. For $\Theta=\pi/4$, the contributions of the spatial and spectral components are equally superimposed on the detector 28.

The image at the detector can be found to be the quantity I given by the below expression:

$$I(x,y,\Phi,\theta) = \qquad (11)$$

$$\iiint_{-\infty}^{\infty} B(x_1,y_1,z_1)\delta[x-(x_1\cos\Phi+y_1\sin\Phi)\tan\theta - z_1]$$

$$\delta[y-(y_1\cos\Phi-x_1\sin\Phi)\tan\theta] \cdot dx_1 dy_1 dz_1$$

where $\delta()$ is a Dirac impulse function known in the art. This spectro-tomographic transform of $B(x_1,y_1,z_1)$ produces projections along lines in planes parallel to the spatial-spectral $(x-z_1)$ plane (see FIG. 2). As seen in FIG. 2 the $x$-$z_1$ plane is rotated around the $z_1$ axis by angle $\Phi$ relative to the $x_1$ axis. The lines of integration 58 intersect the spatial coordinate plane $(x_1$-$y_1)$ at angle $\Theta$ as previously described with reference to FIG. 2.

One way to change the spectral-spatial angle $\Theta$ is to vary the focal length $f_2$ by zooming, that is, by changing the zoom factor $f_3/f_2$. The angle $\Theta$ could also be changed by adjusting the spatial frequency (v) of the diffraction grating 24 in a manner known in the art. Mathematical rotation in $\Phi$ (see FIG. 2) does not require any changes to the optical elements of the RST imager 10 of FIG. 1. Consequently, it is physically simpler to change $\Phi$ than to change $\Theta$ in the spectro-tomographic measurements related to the present invention.

Expression (11) represents a transformation from a three-dimensional $(x_1,y_1,z_1)$ object space to a four-dimensional $(x,y,\Phi,\Theta)$ projection space. Image reconstruction related to the present invention involves conversion from projection space back to object space. Reconstruction algorithms based on analytic inversion formulas leading to transform methods are more fully described in the technical article, herein incorporated by reference: "Reconstruction Algorithms: Transform Methods" of R. M. Lewitt, published in *Proc. IEEE*, 71(3), 390–408, 1983. The reconstruction algorithms may also be based on finite series expansions leading to algebraic reconstruction techniques more fully described in the following technical articles, herein incorporated by reference: "Series-Expansion Reconstruction Methods" of Y. Censor, published in *Proc. IEEE*, 71(3) 409–419, 1983 and "Algebraic Reconstruction Techniques can be made Computationally Efficient" of G. T. Herman, published in *IEEE Trans. Med. Imag.*, 12(3), 600–609, 1993.

With regard to the inversion of the transform represented by expression (11), for a fixed dispersion angle given by $\Theta_k$, the subscript k identifying a set of measurements, the inversion $I_k$ may be represented by the below expression:

$$I_k(x,y,\Phi) = \qquad (12)$$

$$\iiint_{-\infty}^{\infty} B(x_1,y_1,z_1)\delta[x-(x_1\cos\Phi+y_1\sin\Phi)\tan\Theta_k - z_1]$$

$$( )\delta[y-(y_1\cos\Phi-x_1\sin\Phi)\tan\Theta_k] dx_1 dy_1 dz_1$$

The sifting property of the delta function (d) is more fully discussed in the textbook "The Fourier Transform and Its Application" of R. N. Bracewell, published by McGraw-Hill, New York, 1965, and herein incorporated by reference. The sifting property may be used to obtain $I_k$ given by the below expression:

$$I_k(x,y,\phi) = \qquad (13)$$

$$\int_{-\infty}^{\infty} B\left(\frac{(x-z)\cos\Phi - y\sin\Phi}{\tan\Theta_k}, \frac{(x-z)\sin\Phi + y\cos\Phi}{\tan\Theta_k}, z\right)\frac{dz}{\tan^2\Theta_k}$$

Analytic expressions for inversion of expression (13) may be derived by taking the two dimensional (2-D) Fourier transform of $I_k$ to yield the quantity $F_2$ given by the below expression:

$$F_2[I_k(x,y,\Phi)](f_x,f_y,\Phi)=F_3[B(x_1,y_1,z_1)]$$

where $F_2$ and $F_3$ are the 2-D and 3-D Fourier Transforms, respectively, $f'_x=\tan\Theta_k(f_x\cos\Phi-f_y\sin\Phi)$, $f'_y=\tan\Theta_k(f_y\sin\Phi+f_y\cos\Phi)$, and $f'_z=f_x$. The relationship between the 2-D Fourier transform of the projections $I_k$ and the 3-D Fourier transform of the object B is another form of the Fourier Slice Theorem that provides the basis of tomographic imaging. The Fourier Slice Theorem is more fully described in the following technical articles, herein incorporated by reference, "Principles of Computerized Tomographic Imaging" of A. C. Kak, and M. Slaney, published in *IEEE Press*, New York 1988 and "Strip Integration in Radio Astronomy" by R. N. Bracewell, published in *Aust. J. Phys.*, 9, 198–217, 1956.

Here $(f_x, f_y, \Phi)$ space is transformed into $(f'_x, f'_y, f'_z)$ space. The inverse coordinate transformation is given by the below expressions:

$$f_x = f'_x \tag{15}$$

$$f_y = \frac{\sqrt{f'_x{}^2 + f'_y{}^2 - f'_z{}^2 \tan^2 \Theta_k}}{\tan \Theta_k} \quad \text{for } f'_x{}^2 + f'_y{}^2 \geq f'_z{}^2 \tan^2 \Theta_k \tag{16}$$

$$\tan \Phi = \frac{f_y f'_z - f'_x f_y}{f_y f'_z + f'_x f_y} \tag{17}$$

The information in Fourier space where $f'_x{}^2 + f'_y{}^2 < f'_z{}^2 \tan^2 \Theta_k$ is lost when using expression (5) for fixed values of the quantity $\Theta_k$.

Taking the inverse 3-D Fourier Transform of expression (12) and changing the variables of integration yields the below quantity represented by the below expression:

$$\tilde{B}_k(x_1, y_1, z_1) = \tag{18}$$

$$\int_0^{2\pi} F_1^{-1}[F_1[I_k(x,y,\Phi)](x,f_y,\Phi)H(f_y)f_y](\alpha_k, \beta_k, \Phi) \tan^2 \Theta_K d\Phi$$

where $F_1^{-1}$ and $F_1$ are the inverse and forward 1-D Fourier transforms (respectively) in the y-direction, $\alpha_k = (x_1 \cos\Phi + y_1 \sin\Phi)\tan\Theta_k + z_1$, and $\beta_k = (-x_1 \sin\Phi + y_1 \cos\Phi)\tan\Theta_k$. Interpolation, in a manner known in the art, is necessary to compute values at $\alpha_k$ and $\beta_k$. Implementation of expression (18) employs one-dimensional frequency space filter [H(f_y) f_y], where H(x)=0 for x<0, H(x)=½ for x=0, and H(x)=1 for x>0, and two-dimensional back projection along the coordinate transformations x=$\alpha_k$ and y=$\beta_k$. Expression (18) for the direct inversion of expression (13) provides the basis for the analysis related to the practice of the present invention.

Spectral resolution of the recovered image of the detected object 36 improves as $\Theta_k$ is reduced, but if $\Theta_k$ is made arbitrarily small, the spatial resolution of the object 36 is lost. The spatial resolution is limited by the finite number and size of the pixels in the focal plane array 56 of the detector 28. A pixel of size $\Delta x$ by $\Delta y$ accumulates the photon flux over its surface. For a pixel centered at coordinates (x,y) the sampled detector intensity is given by the below expression:

$$I_k{}^s(x,y,\Phi) = \tag{19}$$

$$\int\int_{-\infty}^{\infty} I_k(x',y',\Phi) \pi\left(\frac{x-x'}{\Delta x}\right) \pi\left(\frac{y-y'}{\Delta y}\right) dx, dy,$$

where $I_k$ is given by expression (13). $\Pi(x) = \{1 \text{ for } \{x\} < 0.5; 0 \text{ for } |x| > 0.5\}$ is the rectangle function described in textbook of R. N. Bracewell previously mentioned and superscript "s" denotes values derived from samples at the detector 28. Using the 2-D Fourier transform over (x,y), the convolution in expression 19 becomes a multiplication with the result given by the below expression:

$$I_k{}^s(f_x,f_y,\Phi) = F_2[I_k(x,y,\Phi)](f_x,f_y,\Phi) \Delta x \Delta y \, \text{sinc}(\Delta x f_x) \, \text{sinc}(\Delta y f_y) \tag{20}$$

where sinc $(f_x) = [\sin(\pi f_x)] \Pi / (\pi f_x)$ is the Fourier transform of (x) and the over tilde () indicates the Fourier transform of $I_k$.

The finite pixel sampling in the image plane limits the spatial frequencies in the lowpass filtering by filter 14 to the approximate ranges $|f_x|$ less than $\sim 1/(2\Delta x)$ and $|f_y|$ less than $\sim 1/(2\Delta y)$. In these ranges, the lowpass filter 14 effect of expression 20 is minimized. To satisfy these conditions, it is recommended that the spatial frequencies be restricted to the below values:

$$|f'_z| \text{ less than } \sim 1/(2\Delta x) \text{ and } (f'_x{}^2 + f'_y{}^2 - f'_z{}^2 \tan^2\Theta_k)^{1/2} \text{ less than } \sim \tan\Theta_k/(2\Delta y)$$

Restricting the spatial frequencies to the above given quantities, and following the hereinbefore practice of the present invention, yield the below spatial components:

$$\tilde{I}_k{}^s(f_x,f_y,\phi) = F_3[B(x_1,y_1,z_1)](f_x,f_y,f_z)H(f'_x{}^2 + f'_y{}^2 - f'_z{}^2 \tan_k{}^2 \Phi) \tag{21}$$

$$\Delta x \Delta y \, \text{sinc}(f_z \Delta x) \, \text{sinc}\left(\sqrt{f'_x{}^2 + f'_y{}^2 - f'_z{}^2 \tan^2\Theta_k} \cdot \frac{\Delta y}{\tan\Theta_k}\right)$$

The parameter $\tan\Theta_k$ affects the spatial and spectral resolutions in a complementary fashion. The measurements $I_k{}^s$ contain no information inside a cone defined by the below expression:

$$f'_z{}^2 > (f'_x{}^2 + f'_y{}^2)/\tan^2\Theta_k. \tag{22}$$

Lowpass spatial filtering attenuates components for the below quantities:

$$f'_x{}^2 + f'_y{}^2 > \left(f'_z{}^2 + \frac{1}{(2\Delta y)^2}\right) \tan^2\Theta_k \text{ and } f'_z{}^2 > \frac{1}{(2\Delta x)^2} \tag{23}$$

As $|\tan\Theta_k| \to 0$, expression 22 illustrates that the range of Fourier components $(f'_z)$ for wavelength information in the reconstruction improves but, from expression 23, the range of spatial frequencies $(f'_x, f'_y)$ vanishes Similarly, as $|\tan\Theta_k| \to \infty$ the range of spatial frequencies improves with the loss of wavelength information.

Limited data in computed tomography may result from restrictions created by lack of information in the Fourier space "exclusion cone" defined by expression 22 because all of the integration paths are limited to a single angle $(\Theta_k)$ relative to the plane of the $(x_1, y_1)$ spatial axes (see FIG. 2). To fill in the missing data in the exclusion cone, rotational spectro-tomographic (RST) measurements with several values of $\Theta_k$ can be combined in the analysis.

An efficient fill-in procedure is derived by letting $\tan\Theta_k = \frac{1}{2}k$, where k=0,1,2,3,... is the index in the previously given equations where shown. The k=0 imaging system has focal lengths scaled such that $f_3 = f_2$ yielding $\tan\Theta_0 = 2^0 = 1$ (see FIG. 3). For k=1, $\tan\Theta_1 = \frac{1}{2}$ requires that $f_3 = f_2/2$ (see FIG. 4). Other values of k can be obtained by zooming second lens 22 of FIG. 1. The 3-D Fourier transform of the samples at the image plane 56 of the detector 28 are given by the below expression:

$$\tilde{I}_k{}^s(f_x,f_y,\Phi) = B(f_x,f_y,f_z) \cdot G_k(f_x,f_y,f_z)$$

where some of the quantities of expression (24) are given by the below expression:

$$G_k(f_x,f_y,f_z) = \tag{25}$$

$$H(f'_z{}^2 - f_z{}^2/2^{2k}) \Delta x \Delta y \, \text{sinc}(f_z \Delta x) \, \text{sinc}(\sqrt{f'_r{}^2 - f_z{}^2/2^{2k}} \, \Delta y 2^k)$$

$f'_x = (f_x \cos\Phi - f_y \sin\Phi)/2^k$, $f'_y = (f_y \sin\Phi + f_x \cos\Phi)/2^k$, $f'_z = f_z$, and $f'_r = (f'_x{}^2 + f'_y{}^2)^{1/2} = (f_x{}^2 + f_y{}^2)^{1/2}$ is the radial frequency coordinate for cylindrical $(f_r, f_z)$ geometry. $G_k$ is the transfer function of the RST imager 10 of FIG. 1 with focal length $f_2 = f_3 \cdot 2^k$. The various transfer functions related to expression (24), wherein k is varied are illustrated in FIG. 5 comprised of FIGS. 5(a)–5(f) in which the associated k and resulting tan$\Theta$ quantities are listed in Table 2.

TABLE 2

| Fig. 5 | k | tan θ |
|---|---|---|
| a | 0 | 1 |
| b | 1 | ½ |
| c | 2 | ¼ |
| d | 3 | ⅛ |
| e | 4 | 1/16 |

Figure 5A:
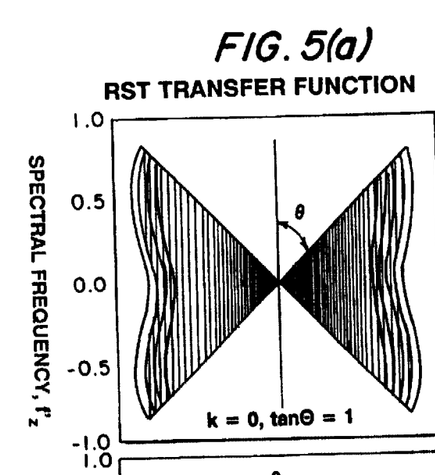
FIG. 5 is composed of FIGS. 5(a), 5(b), 5(c), 5(d), 5(e) and 5(f) and illustrates various rotational spectro-tomographic transfer functions related to five different values for different focal lengths of the RST imager of FIG. 1.
Figure 5B:
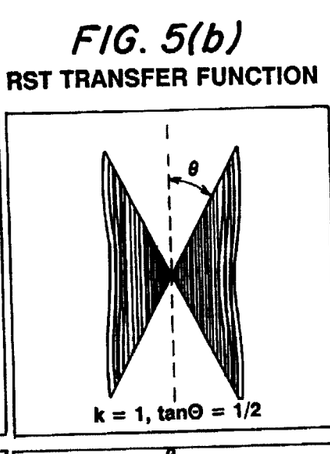
Figure 5C:
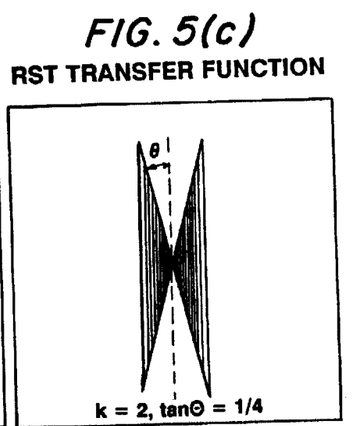
Figure 5D:
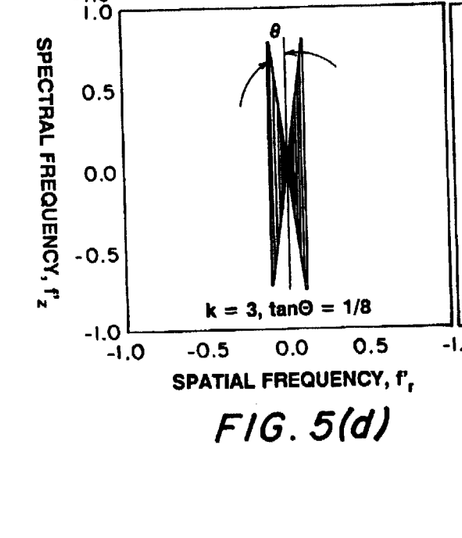
Figure 5E:
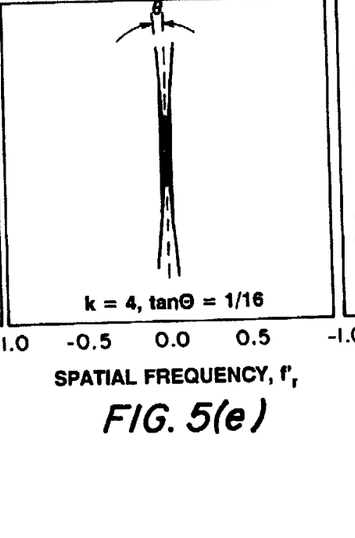
Figure 5F:
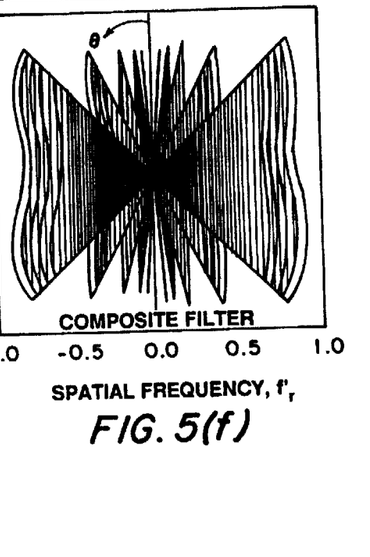

Each of FIGS. 5(a)–5(f) has an abscissa and ordinate specified in the spatial frequency $f_z$, wherein the ordinate shown for FIG. 5(a) is shared by FIGS. 5(b) and 5(c) and, similarly, the ordinate of FIG. 5(d) is shared by FIGS. 5(e) and 5(f).

FIGS. 5(a)–(e) illustrate rotational spectro-tomographic transfer function for five values (see Table 2) of tan$\Theta = \frac{1}{2}^k = f_3/f_2$, where $f_2$ and $f_3$ are the RST imager 10's focal lengths shown in FIG. 1. The transfer function varies from zero indicated by the black regions of FIGS. 5(a)–(f), to unity indicated by the white regions of FIGS. 5(a)–5(f). The contour lines of FIGS. 5(a)–5(f) (not clearly shown) are separated by steps of 1/10. The five transfer functions of FIGS. 5(a)–(e) are combined to form a composite transfer function illustrated in FIG. 5(f).

FIGS. 5(a)–5(e) illustrate the transfer functions for k=0 through 4 (see Table 2) assuming that $\Delta x$ and $\Delta y$ of expression 25=1. From FIGS. 5(a)–(e) it may be seen that as "k" is increased, the exclusion cone around the $f_z$-coordinate narrows with the half angle $\Theta_k = \tan^{-1}(\frac{1}{2}^k)$ and the range in spatial frequency $f_r$ diminishes.

A more accurate Fourier transform of the reconstructed data cube can be obtained by summing the non-overlapping components of expression 24. New information is provided by the $k^{th}$ solution of expression 24 that is not contained inside the (k–1) exclusion cone where $H(f_r^2 - f_z^2/2^{(k-1)})$ is zero.

The three dimensional information from a spectral image can be reconstructed with a set of rotational spectro-tomographic data $I_k^x(x,y,\Phi)$ for k=0,1,2, ... The reconstruction procedure employs a series to yield the data cube representation $B(x_1,y_1,z_1)$ that is more fully disclosed in the technical article "Direct Reconstruction Methods for Hyper-Spectral Imaging With Rotational Spectro-Tomograph" of P. A. Bernhardt, published in J. Opt. Soc. Am. A, vol. 12, p.p. 1884–1901 (1995), and herein incorporated by reference.

Each term in the series in the technical article of P. A. Bernhardt extracts information with the transfer functions of Fourier space filters that are illustrated in FIGS. 5(a)–5(e). The addition of each additional ($k^{th}$) term in the series provides more spectral-frequency ($f_z$) information in successively smaller regions of spatial frequency ($f_x, f_y$).

The overall transfer function of the RST imager of FIG. 1 obtained by using five terms (such as those of FIGS. 5(a)–5(e) in the series is the composite data filter shown in FIG. 5(f). This function shown in FIG. 5(f) is cylindrically symmetric around the $f_z$-axis. The data exclusion cone is filled in by the higher-order terms of the series, but a region of $f_z$-axis is always excluded. Previews attempts at developing a RST imager with zooming (Mooney, Roscour, Levin) have transfer functions shown in FIGS. 5(a). The present RST imager with zooming has a much improved transfer function illustrated in FIG. 5(f). This produces much better quality measurements of the object Reconstruction of an object 36 of FIG. 1 from measurements achievable by the RST imager 10 of FIG. 1 can be performed either in configuration $(x_1,y_1,z_1)$ space using filter-backprojection techniques or in frequency $(f_x,f_y,f_z)$ space using interpolation and Fourier transform techniques. These techniques are well documented for computerized tomographic imaging such as described in the previously incorporated by reference "Principles of Computerized Tomographic Imaging," of A. C. Kak and M. Slaney.

In the practice of this invention, hyper-spectral imaging was achieved with a rotational spectro-tomographic system also having the capability of varying, by means of the zooming functions hereinbefore described, the spatial magnification of the object 36 at the image plane 56 of the detector 28. The total number of RST imager 10 projections required to fully reconstruct an object on a N×N×N grid is N k where k=$\log_2$N–2, and each projection is an image composed of 2N×N pixels. The total number of pixels required to reconstruct an object 36 is 2($\log_2$N–2)N$^3$. The photon capture efficiency of the RST imager 10 is substantially unity which represents a substantial improvement over the prior art devices discussed in the "Background" section.

Prior art hyper-spectral systems using multiple filter imagers or scanning imaging spectrometers record N projections, each composed of N×N pixels. These prior art systems require a total of N$^3$ pixels to define the object and their photon capture efficiency is typically 1/N which represents a substantial degradation when compared to the RST imager 10 of the present invention.

One of the advantages to the RST imager 10 is that through-put for the photon collection is N times that for conventional hyper-spectral techniques. However, it should be noted (1) that a factor of 2($\log^2$N–2) more pixel data must be accumulated and (2) that tomographic algorithms are needed to reconstruct the object. These drawbacks are substantially overwhelmed by the benefits of the present invention. Rotational spectro-tomography imager 10 of the present invention is particularly suited when photon counting sensitivity and related temporal resolution are of importance for hyper-spectral imaging measurements.

It should now be appreciated that the practice of the present invention provides for a rotational spectro-tomographic (RST) imager that collects and utilizes substantially all of the photon flux emitted by an object and determines the composition of the object by the analysis of the photon flux.

It should, therefore, be readily understood that many modifications and variations of the present invention are possible within the purview of the claimed invention. It is, therefore, to be understood that, within the scope of the appended claims, the invention may be practiced otherwise than as specifically described.

What we claim is:

1. A rotational hyper-spectral-tomographic (RST) imager having an optical axis and that resolves the image of an object into spatial (x,y) coordinates and a spectral coordinate that includes the optical wavelength (λ) from the detection of the photon flux emitted by the object, wherein the spatial and spectral coordinates determine the characteristics of the object, said imager comprising:

(a) a filter located at the input stage of the imager and having first and second faces, said filter having means for passing a predetermined range of wavelengths, said first face positioned to receive said photon flux of the object;

(b) a first lens having first and second faces with the first face positioned to look toward said second face of said filter;

(c) a field lens having means for being mounted for rotation and having a circular aperture of a predetermined radius $r_a$ and being positioned from said first lens by a first predetermined focal length $f_1$;

(d) a zoom lens having first and second faces and having means for being mounted for movement relative to said field lens so as to establish an adjustable second focal length $f_2$, said first face of said zoom lens positioned to look toward said second face of said first lens;

(e) a diffracting grating having first and second faces and having means for being mounted for rotation, said first face thereof positioned to look toward said second face of said zoom lens;

(f) a second lens having first and second faces and having means for being mounted for movement, said first face thereof positioned to look toward said second face of said diffracting grating; and (g) a detector for detecting said photon flux of said object and having a receiving surface positioned to look toward said second face of said second lens and located relative to said second lens to establish a third focal length $f_3$;

said circular aperture of said field lens having its central portion in coincidence with said optical axis and, similarly, said filter, said first, second, and second lens, said diffracting grating and said detector each having a central portion that is also in coincidence with said optical axis; and said imager being rotated in fixed angular steps around said optical axis.

2. The rotational hyper-spectral-tomographic imager according to claim 1, wherein said imager develops dispersed images having a reference axis $x_1$ an axis $z_1$ and a plane $x_1y$ and which are projections of an object data cube along an integration line that: (1) makes an angle $\Theta$ with a plane defined by the x and y spatial coordinates, said zoom and second lens being movable to establish a focal length ratio $f_3/f_2=\tan \Theta$, and (2) makes a rotation angle $\Phi$ with reference axis $x_1$ by rotation of $x_1y$ plane around $z_1$ axis, said imager being rotatable to establish angle $\Phi$.

* * * * *